United States Patent
Hartman et al.

(10) Patent No.: US 7,095,435 B1
(45) Date of Patent: Aug. 22, 2006

(54) PROGRAMMABLE MULTIFUNCTION ELECTRONIC CAMERA

(76) Inventors: Richard L. Hartman, 6767 Old Madison Pike, Suite 410, Huntsville, AL (US) 35806; Keith B. Farr, 200 Merganser Blvd., Madison, AL (US) 35758

( * ) Notice: Subject to any disclaimer, the term of this patent is extended or adjusted under 35 U.S.C. 154(b) by 0 days.

(21) Appl. No.: 10/895,615

(22) Filed: Jul. 21, 2004

(51) Int. Cl.
*H04N 5/228* (2006.01)

(52) U.S. Cl. .................... 348/222.1; 348/294

(58) Field of Classification Search ............. 348/222.1, 348/294
See application file for complete search history.

(56) References Cited

U.S. PATENT DOCUMENTS

| | | | |
|---|---|---|---|
| 3,689,772 A | 9/1972 | George et al. | |
| 4,869,574 A | 9/1989 | Hartman | |
| 5,883,830 A * | 3/1999 | Hirt et al. | 365/185.03 |
| 6,046,769 A * | 4/2000 | Ikeda et al. | 348/222.1 |
| 6,256,350 B1 * | 7/2001 | Bishay et al. | 375/240.21 |

OTHER PUBLICATIONS

K.B. Farr and R.L. Hartman, "Fourier Plane Detectors for Optical Image Processing," SPIE 3386, pp. 78-86, (1998).

Fast Object Recognition using a Hybrid Optical/Digital Processor—D.J.F. Walker and C.R. Chatwin—Proceedings of the British Machine Vision Conference, Sep. 1990, p. 413-418, RAE CAT:4, CVCP Cat:4.

* cited by examiner

Primary Examiner—Ngoc-Yen Vu
Assistant Examiner—Adam L. Henderson
(74) Attorney, Agent, or Firm—Waddey and Patterson, P.C.; Larry W. Brantley; Howard H. Bayless (57) ABSTRACT

A programmable multifunction electronic camera uses a commercial pixel digital energy sensor to generate detector element signal digital data normally generated by expensive, custom designed, detector element energy sensors. The camera performs this function by retrieving pixel signal digital data and pixel location data from the pixel energy sensor, retrieving detector element energy sensor masks containing information regarding the size, shape, and location of detector elements included in the detector element energy sensors, mapping the pixels included in the pixel energy sensor to the energy sensor masks to identify pixels that can be combined to create "virtual detector elements" having the same size, shape, and configuration as the detector elements in the detector element energy sensors, and combining the pixel signal digital data associated with the mapped pixels to generate the detector digital data. The camera can be programmed with a number of different energy sensor masks and mapping algorithms.

15 Claims, 7 Drawing Sheets

PROGRAMMABLE MULTIFUNCTION ELECTRONIC CAMERA

BACKGROUND OF THE INVENTION

Electronic cameras are well known in the prior art and include conventional video cameras and digital cameras. These cameras typically include pixel image sensors having rectangular arrays of photodetector picture elements, or pixels, which are used to record conventional images for viewing by human observers. The pixel image sensors required by these cameras are manufactured in large quantities and, as a result, are inexpensive and readily available for use by consumers.

Special purpose electronic cameras, that is, electronic cameras that are designed to perform specific functions rather than to simply allow a consumer to view conventional images, are also well known in the prior art. These cameras are used in a variety of fields, including the security, manufacturing, and inspection fields, and include line scan cameras, rosette scan cameras, quadrant detectors, pan-zoom-tilt cameras, cameras that trade off numbers of pixels for frame rate, stereo cameras, windowing cameras, lock-in cameras (experimental only), and others. In contrast to other electronic cameras, special purpose cameras typically include custom designed detector element image sensors, i.e., image sensors that include detector elements having various shapes and sizes rather than pixels.

Prior art special purpose cameras currently have a number of disadvantages that make them undesirable in many applications. First, the custom designed detector element image sensors required by these cameras are generally manufactured in small quantities for specific applications and tend to be expensive. This causes these types of cameras to be expensive.

Second, these cameras tend to be large and bulky because the custom designed detector element image sensors usually require amplifiers for each detector element that are physically separated from the detector elements and connected using separate cables. Examples of special purpose cameras having this disadvantage are described in U.S. Pat. No. 3,689,772 ("the '772 patent"), issued to George et al. on Sep. 5, 1972 and entitled "Photodetector Light Pattern Detector" and U.S. Pat. No. 4,869,574, issued to Hartman on Sep. 26, 1989 and entitled "Hybrid Optical Correlator."

The problem of large and bulky special purpose cameras has been partially addressed by one of the inventors listed on the '772 patent, Nicholas George, who developed a special purpose camera that included a hybrid ring/wedge detector element image sensor, a digital multiplexer for acquiring and relaying data to a host computer, and an electronic system that grouped the amplifiers required by the detector element image sensor onto a series of electronic boards. This camera, however, still required separate cables for each ring and wedge shaped detector element in the image sensor.

Special purpose electronic cameras have limited capabilities because they include custom designed detector element image sensors that can only be used to perform certain specific functions. For example, some prior art special purpose cameras include image sensors that include ring shaped detector elements that can be used to analyze optical power spectra, while others include image sensors that include wedge shaped detector elements that can be used to make precise angular measurements. Image sensors including ring shaped detector elements cannot be used to perform the same functions that are performed by image sensors including wedge shaped detector elements.

This problem has been partially addressed by the prior art, which teaches the use of special purpose cameras that include hybrid or combination detector element image sensors. An example of one such image sensor is described in the '772 patent referenced above. The hybrid ring/wedge detector element image sensor taught by the '772 patent includes both ring shaped and wedge shaped detector elements and can be used to analyze optical power spectra and to make precise angular measurements.

While hybrid detector element image sensors can be used to increase the capabilities of special purpose cameras, they may not be practical in some applications. For example, hybrid image sensors may be too expensive or too large to be used in a given application. Furthermore, even where hybrid image sensors can be used, special purpose cameras are still limited to performing only the functions that can be performed using the hybrid image sensor.

The limited capability problem has also been addressed by the assignee of the present invention, Advanced Optical Systems, Inc., who developed a special purpose camera using a combination detector element image sensor that includes two sub arrays: a first sub array including multiple ring and wedge shaped detector elements for analyzing optical power spectra, and a second sub array including multiple off-set wedge shaped detector elements for precise angular measurement. This combination detector element image sensor, however, has the same disadvantages associated with the hybrid ring/wedge image sensor discussed above, as well as several additional disadvantages.

First, it is inherently expensive because it is a special purpose image sensor and has limited application. Second, although both sub arrays are present on a single detector chip, only one sub array can be used at any given time. Third, each detector element requires a dual-stage amplifier, which doubles the number of amplifiers required by this image sensor and increases the size of the circuit board required to support the image sensor. The large number of amplifiers also generates a great deal of heat. Finally, this image sensor requires short leads between the detector elements and the amplifiers and, as a result, the image sensor has to be mounted directly on the circuit board with the amplifiers. This, in turn, makes it awkward to mount the optical system used with the image sensor. This prior art camera is described in a paper written by the inventors listed on the present application and entitled "Fourier Plane Detectors for Optical Image Processing." That paper is hereby incorporated by reference into this application.

An additional disadvantage associated with special purpose cameras is the fact that the capabilities of these cameras typically cannot be modified once they are purchased by a consumer. If a consumer desires to do so, he or she typically must purchase an entirely new special purpose camera with the desired capabilities. This increases costs for consumers who require a special purpose camera that can perform multiple different functions.

One example of this type of special purpose camera is the circular scan camera. This type of camera includes a detector element image sensor having annular shaped detector elements of a predetermined height, distance from the center, and angular width. In order to change the height, distance from center, or angular width of the image sensor, one must purchase a new camera having a new specially designed detector element image sensor having detector elements with the required height, distance from center, and angular width.

Another problem with special purpose electronic cameras is that they are difficult to manufacture because the custom designed detector element image sensors used in these devices are not readily available from manufacturers. This is due primarily to the fact that these types of image sensors are manufactured in small quantities and are expensive.

The assignee of the present invention is aware of one prior art special purpose camera that does not require a custom designed detector element image sensor. This camera is described in a paper written by D. J. F. Walker and C. R. Chatwin and entitled "Fast Object Recognition using a Hybrid Optical/Digital Processor." This paper was published in the September 1990 Proceedings of the British Machine Vision Conference, pgs. 413–418, RAE Cat: 4, CVCP Cat: 4, and is hereby incorporated by reference into this application. The prior art camera described in this paper includes a CCD pixel image sensor including a pixel array, external analog to digital converters, and a digital signal processor that is used to form wedge and ring samples using individual pixels included in the pixel array.

Although this prior art camera does not require the use of a custom designed detector element image sensor and, as a result, does not have the disadvantages associated with this type of requirement, it nevertheless still has several of the disadvantages discussed above with regard to other prior art special purpose cameras. This camera is large and bulky and can only be used to perform the functions that can be performed using the wedge and ring samples. This camera cannot be easily modified to perform additional functions. This camera also has the additional disadvantage that it generates ring and wedge samples that include blank areas because pixels along the edges of a wedge or ring are eliminated from consideration.

What is needed, then, is a special purpose camera that is smaller, more compact, and less expensive, and that can be used to perform multiple different functions, that can be easily modified to perform one function and then another, and that includes an image sensor that is inexpensive and readily available from manufacturers.

SUMMARY OF THE INVENTION

Accordingly, one object of the present invention is to provide a special purpose electronic camera that is smaller and more compact than prior art special purpose electronic cameras.

Another object is to provide a special purpose electronic camera that is less expensive than prior art special purpose electronic cameras.

A third object is to provide a special purpose electronic camera that can perform the functions normally performed by multiple different special purpose electronic cameras.

A fourth object of the present invention is to provide a special purpose electronic camera that can be easily modified to perform the functions associated with one type of special purpose electronic camera and then another.

A fifth object is to provide a special purpose electronic camera that can be manufactured using readily available commercial off-the-shelf image sensors.

Still another object is to provide a special purpose electronic camera that eliminates the need for the use of cables connecting the detector elements of the image sensor to supporting electronics.

Yet another object of the present invention is to provide a special purpose electronic camera that eliminates the need for the image sensor detector elements to be connected to one or more external amplifiers.

An eighth object is to provide a special purpose camera system that includes small detector elements so that the camera optical system can have short focal lengths.

An ninth object of the present invention is to reduce the cost of special purpose electronic cameras by providing a special purpose electronic camera design that uses common hardware to generate special purpose electronic cameras having different configurations.

A tenth object of the present invention is to provide a special purpose electronic camera that allows experimental and developmental users to change the camera configuration from one configuration to another without buying a new camera.

These objects, and other objects that will become apparent to one skilled in the art practicing the present invention or reading this application, are satisfied by the programmable multifunction electronic camera of the present invention. The electronic camera includes an enclosure, a lens (or light collecting) assembly, camera interface connectors, an image (or energy) sensor board, a processing board, and a camera interface board. The enclosure is designed to have the lens assembly and the camera interface connectors mounted on it and the image sensor, image processing, and camera interface boards mounted inside it. The lens assembly is designed to focus images (or, more generally, energy) on an image (or energy) sensor on the image sensor board. The camera interface connectors are designed to allow the camera to be connected to external devices, such as computer systems and flash memory.

The image sensor board is designed to generate pixel signal digital data in response to images that are received from the lens assembly and to output that data to the image processing board. To perform these functions, the image sensor board includes an integrated pixel-based, digital image sensor having a pixel array, analog to digital (A/D) converters, a sensor input/output (I/O) interface, and sensor controls.

The image processing board is designed to convert the pixel signal digital data received from the pixel image sensor into detector element signal digital data representative of analog detector element image sensor signals that would be generated by any one of a variety of different custom designed detector element image sensors, i.e., image sensors that include detector elements rather than small pixels, receiving the images striking the pixel image sensor, and to output that data to the camera interface board. The image processing board performs this function by retrieving pixel digital data and pixel location data from the pixel image sensor, retrieving image sensor maps containing information representative of detector element image sensors from memory, mapping each pixel in the pixel image sensor to one of the detector elements included in the image sensor maps using a mapping algorithm, and then combining the pixel digital data for all of the pixels mapped to each one of the detector elements to generate the detector element data. The image processing board includes an image processing circuit for performing the conversion of the pixel signal digital data and a mask memory for storing the image sensor masks.

The camera interface board is designed to receive mapping algorithms and custom detector element image sensor masks from external computer systems, and to output the detector digital data generated by the camera to those systems. In one embodiment, the camera interface board includes an integrated Universal Serial Bus (USB) peripheral controller, which is used to pass the detector digital data, image sensor masks, and mapping algorithms between the image processing board and the external computer.

In its broadest sense, the lens assembly included in the present invention is simply a light or energy collecting assembly and, as a result, any one of a variety of different types of light or energy collecting assemblies known in the art may be used as well. In a similar manner, the image sensor is simply a light or energy sensor that is designed to receive and sense light or energy. Thus, various other types of light and energy sensors may also be used with the present invention.

DESCRIPTION OF THE PREFERRED EMBODIMENTS

Figure 1:
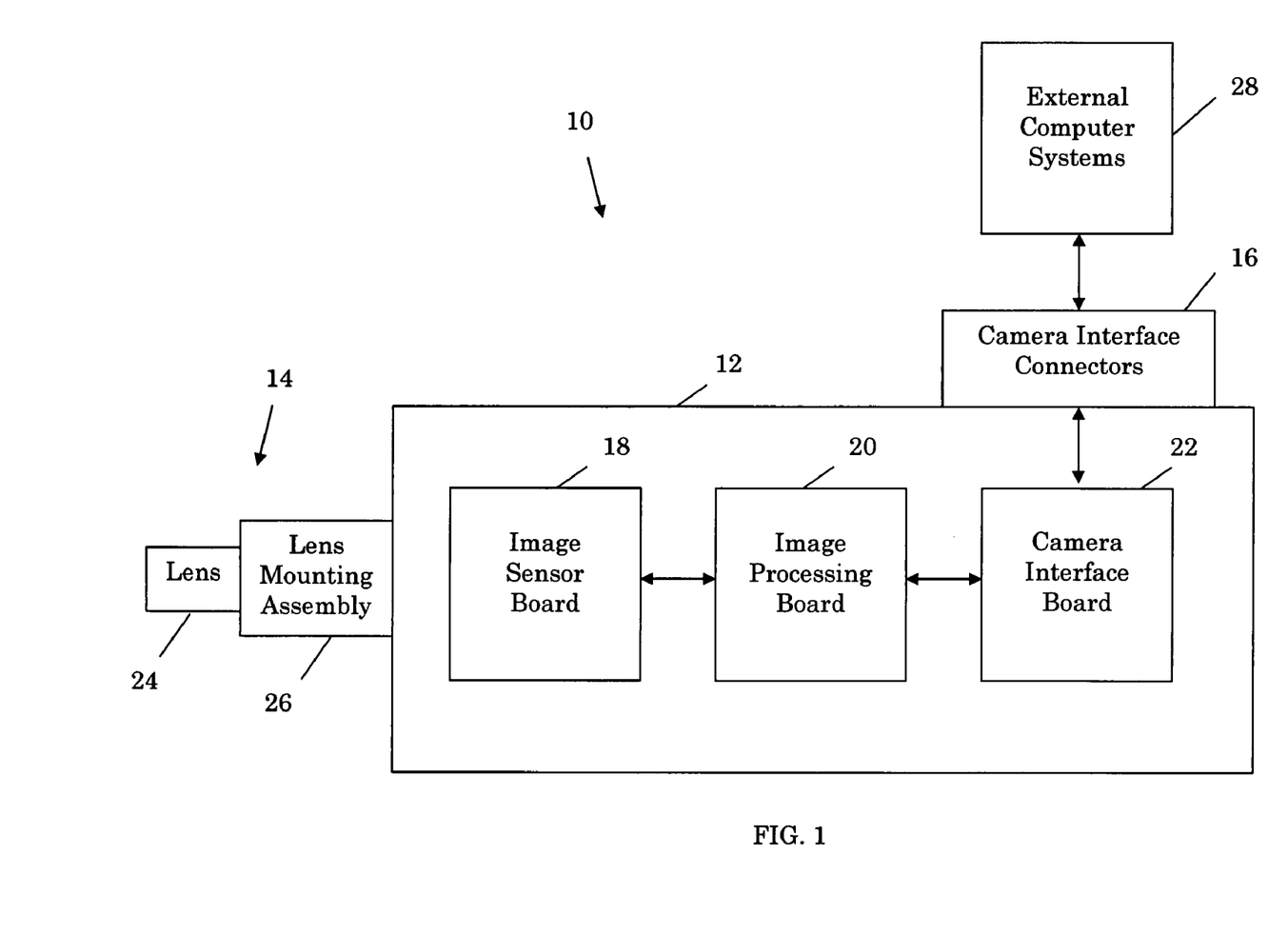
FIG. 1 is a block diagram showing one embodiment of the programmable multifunction electronic camera of the present invention.

Referring to FIG. 1, one embodiment of the programmable multifunction electronic camera 10, of the present invention includes an enclosure 12, a lens assembly 14 (also referred to as a light collecting assembly), camera interface connectors 16, an image sensor board 18, an image processing board 20 (or simply a processing board), and a camera interface board 22. The lens assembly 14 and camera interface connectors 16 are mounted on the enclosure 12 and the image sensor, image processing, and camera interface boards 18, 20 and 22 are mounted adjacent to one another inside the enclosure 12. The image sensor board 18 is mounted adjacent to the lens assembly 14 so that the lens assembly 14 can focus images on an image sensor included with the image sensor board 18 and discussed in more detail below. The camera interface board 22 is mounted adjacent to and is connected to the camera interface connectors 16. The image sensor board 18 is connected to the image processing board 20. The image processing board 20 is connected to the image sensor board 18 and the camera interface board 22.

The enclosure 12 is designed to have the lens assembly 14 and camera interface connectors 16 mounted on it and includes a lens opening (not shown) and connector opening (not shown) for receiving each of these items. The enclosure 12 also includes board mountings (not shown) inside the enclosure 12 that allow the boards to be mounted inside the enclosure 12.

The lens assembly 14 is designed to focus images on the image sensor on the image sensor board 18 (or in some cases, to simply collect light or energy and direct it toward the image sensor, which may also be referred to as a light or energy sensor). The lens assembly 14 includes a lens 24, which is used to collect or focus images, light, or energy in general, and a lens mounting assembly 26, which is used to mount the lens 24 on the enclosure 12 so that it can properly focus images, light, or energy on the image sensor.

The camera interface connectors 16 are designed to allow the camera to be connected to external computer systems 28. The camera interface connectors 16 also allow the camera to be connected to external flash memory devices (not shown) as well.

Figure 2:
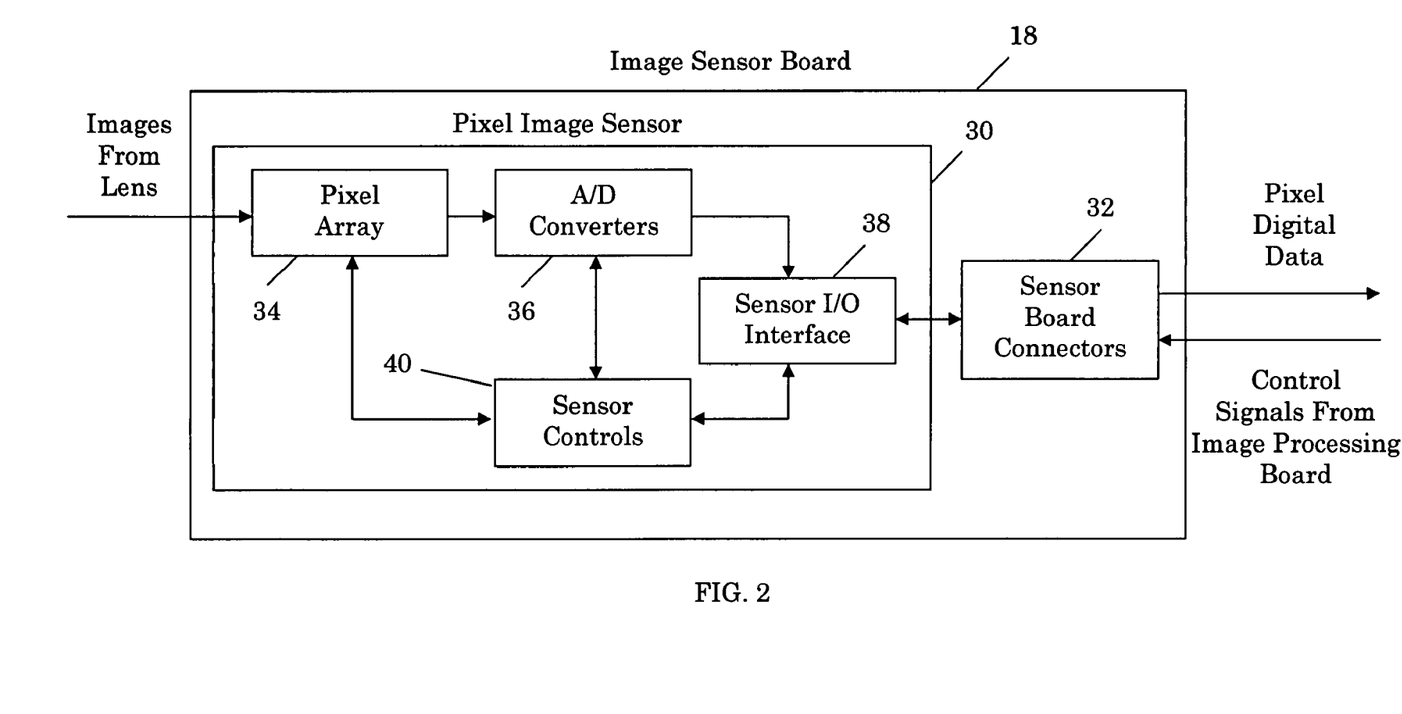
FIG. 2 is block diagram showing the image sensor board for one embodiment of the present invention.

Referring to FIG. 2, the image sensor board 18 includes components that are designed to generate pixel signal digital data ("the pixel digital data") in response to images (or, more generally, light or energy) that are received from the lens assembly 14 and to output that data to the image processing board 20. The image sensor board 18 includes an integrated pixel-based, digital image sensor 30 ("the pixel image sensor 30" or "pixel digital energy sensor 30") that is designed to generate the pixel digital data, and sensor board connectors 32 for connecting the image sensor board 18 to the image processing board 20 and outputting the pixel digital data.

The pixel image sensor 30 includes a pixel array 34, analog to digital (A/D) converters 36, a sensor input/output (I/O) interface 38, and sensor controls 40. The pixel array 34 generates analog pixel signals in response to images, light, or energy received from the lens assembly 14 and the A/D converters 36 convert those signals into the pixel digital data. The sensor I/O interface 38 is connected to the A/D converters 36, the sensor controls 40, and the sensor board connectors 32, and is used to output the pixel digital data to the image processing board 20 and receive control signals from the image processing board 20. The sensor controls 40 control the digitizing of the analog pixel signals and the outputting of the pixel digital data based on the control signals received from the image processing board 20. As shown in FIG. 2, the pixel array 34 and the A/D converters 36 are integrated together on the pixel image sensor 30, which is some cases may be a single integrated chip.

The use of an integrated pixel image sensor 30 reduces the size of the image sensor and allows the camera to be smaller and more compact than prior art special purpose electronic cameras. The integration of these components also eliminates the need for separate cables to connect the pixel array 34 to supporting electronics as required by some prior art special purpose electronic cameras.

Pixel image sensors are inexpensive, commercial, off-the-shelf image sensors that are manufactured in large quantities and are readily available from different manufacturers. The use of this sensor reduces the overall cost of this camera by eliminating the need for expensive custom designed detector element image sensors including specially designed detector element arrays. The use of this sensor also allows the lens assembly 14 used with this camera to have a short focal length because the pixels included in the pixel array 34 are very small.

In one embodiment, the pixel image sensor 30 includes a 1.3 Megapixel CMOS active-pixel digital image (or energy) sensor 30 manufactured by Micron Technology, Inc, part number MT9M413C36STC. Detailed information regarding this sensor is included in a document entitled "1.3-Megapixel CMOS active-pixel digital image sensor" published by Micron. That document is hereby incorporated by reference into the present application.

In alternative embodiments, a pixel image sensor 30 that does not include integrated A/D converters 36, which would be included on one or more separate chips, may be used with the present invention. While embodiments of this type will function properly, it is preferred to use pixel image sensors 30 having integrated A/D converters 36 in order to minimize the size of the camera. In other embodiments, the pixel image sensor 30 and the lens 24 are positioned relative to one another so that the lens 24 generates a Fourier Transform of the energy received by the lens 24.

Figure 3:
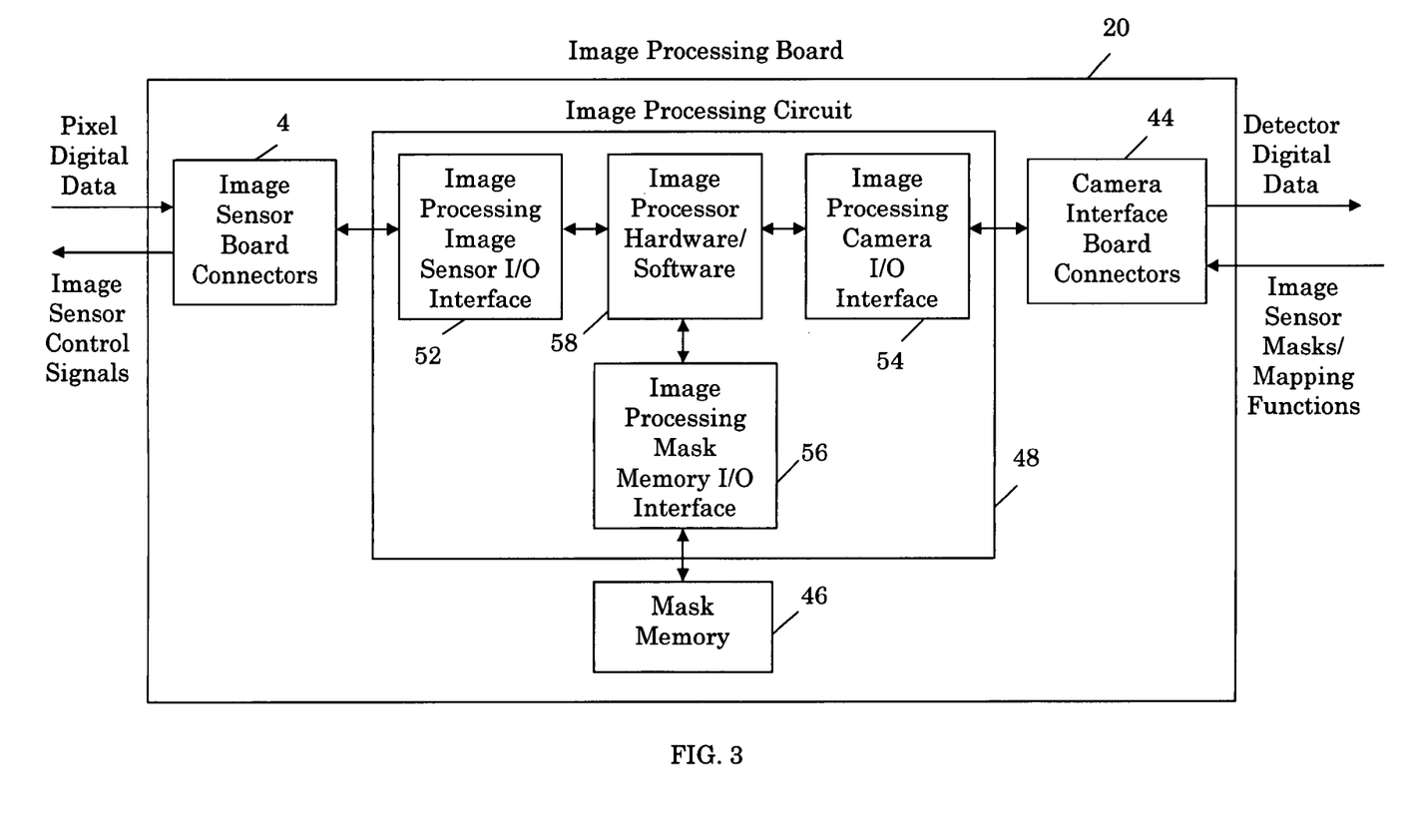
FIG. 3 is block diagram showing the image processing board for one embodiment of the present invention.

Referring to FIG. 3, the image processing board 20 ("the IP board") is designed to convert the pixel digital data received from the pixel image sensor 30 into detector element signal digital data ("the detector digital data") representative of analog detector element image (or energy) sensor signals that would be generated by any one of a variety of different custom designed detector element image (or energy) sensors, i.e., image sensors that include detector elements rather than small pixels ("the detector element image sensors") receiving the images (or light, or energy) striking the pixel image sensor 30, and to output that data to the camera interface board 22. As explained in more detail below, the image processing board 20 converts the pixel digital data into the detector digital data by retrieving pixel digital data and pixel location data from the pixel image sensor 30, retrieving an image (or energy) sensor mask containing information representative of a detector element image (or energy) sensor from memory, mapping each pixel in the pixel image sensor 30 to one of the detector elements included in the image (or energy) sensor mask, and then combining the pixel digital data for all of the pixels mapped to each one of the detector elements to generate the detector element data.

The IP board 20 includes image sensor board connectors 42, camera interface board connectors 44, a mask memory 46, and an image processing circuit 48 (also referred to as simply a processing circuit). The image sensor board connectors 42 are connected to the sensor board connectors 32 and allow pixel digital data to be received from the image sensor and control signals to be passed to the image sensor. The camera interface board connectors 44 are connected to the camera interface board 22 and allow detector digital data to be output to that board, and programming instructions and image sensor masks of detector element image sensors to be received from that board. The mask memory 46 is designed to store the image sensor masks received from the camera interface board 22.

The image sensor masks stored in the mask memory 46 contain information representative of actual detector element image sensors, including information regarding the size, shape, and location of detector elements included in those sensors. An example of one type of image sensor mask that can be stored in the mask memory 46 is a hybrid ring/wedge detector element image sensor mask (see FIG. 4).

Any one of a number of image sensor masks may be stored in the mask memory 46, including masks for hybrid ring/wedge detector element image sensors having half rings and half wedges, hybrid ring/wedge detector element image sensors having full rings and full wedges, ring element image sensors having programmable annulus width profiles, circular scan annular detector element image sensors having programmable inner and outer radii and angular widths, radial scan detectors, linear array detector element image sensors having programmable detector element heights, combination horizontal and vertical linear array detector element image sensors, quad detector element image sensors having a programmable size, detector element image sensors including an array of quad detectors having programmable size and location, and combination quad and ring/wedge detector element image sensors (or other geometries) for alignment functions. Other masks that may be used with the present invention include masks for linear or rectangular array detector element image sensors, wedge array detector element image sensors where the number of wedges varies as a function of the radii of the detectors, detector element image sensors with moveable windows and resizable windows, detector element image sensors with multiple windows, and detector element image sensors with off-set wedge only configurations for high-resolution angular measurement.

The image processing circuit 48 includes an image processing image sensor input/output (I/O) interface 52 ("the image sensor interface 52"), an image processing camera I/O interface 54 ("the camera interface 54"), and an image processing mask memory I/O interface 56 ("the mask memory interface 56"). The image sensor interface 52 is connected to the image sensor board connectors 42, the camera interface 54 is connected to the camera interface board connectors 44, and the mask memory interface 56 is connected to the mask memory 46. The image sensor interface 52 is designed to allow pixel digital data and image sensor control signals to be received from and sent to the image sensor. The camera interface 54 is designed to allow detector digital data and programming instructions to be sent to and received from the camera interface board 22. The mask memory interface 56 is designed to allow image sensor masks to be stored on and received from the mask memory 46.

The image processing circuit 48 also includes image processor hardware and software 58 ("the image processor 58"), which is responsible for generating image control signals that cause the pixel image sensor 30 to send pixel digital data and pixel location data to the image processing circuit 48, generating mask request signals that cause the mask memory 46 to send image sensor masks to the processing circuit, mapping the pixels in the pixel image sensor 30 to the detector elements included in the image sensor masks, combining the pixel digital data for the pixels mapped to the image sensor detector elements, and outputting the resulting detector digital data to the camera interface board 22. The image processor is also responsible for storing image sensor masks received from the camera interface board 22 in the mask memory 46 and storing the mapping algorithm that is used to map the pixels in the pixel image sensor 30 to the image sensor masks.

Currently, the image processor uses two different mapping algorithms to map pixels. The first algorithm is a generic algorithm that maps each pixel in the pixel image sensor 30 to the image sensor masks. This algorithm performs the mapping function by using matrixes to compare the location of each pixel relative to the pixel image sensor 30 with the location of each detector element relative to the pixel image sensor 30. This algorithm is illustrated in matrix and summation form by the following equations:

$$\vec{O} = [W]\vec{I} \quad O_i = \sum_j W_{ij} I_j$$

where I is an input column vector including information representing the locations of pixels included in one column of the pixel image sensor 30, W is a weighting matrix that includes information representing the locations of detector elements in an image sensor mask, and O is an output column vector containing information indicating whether the pixels in the input column vector are located in the detector elements of the image sensor mask. This calculation is performed for each column of the pixel image sensor 30.

The general mapping algorithm typically generates an output matrix that consists predominantly of zeros, indicating that a pixel is not included in a particular detector element on the image sensor mask. A second mapping algorithm that reduces the number of calculations that result in zeros and runs much faster than the generic mapping algorithm may be used instead. This algorithm performs a preliminary calculation to determine if a pixel is located in any of the detector elements and, if not, simply generates a zero for the output matrix without performing the mapping calculations performed in the generic mapping algorithm.

Figure 4:
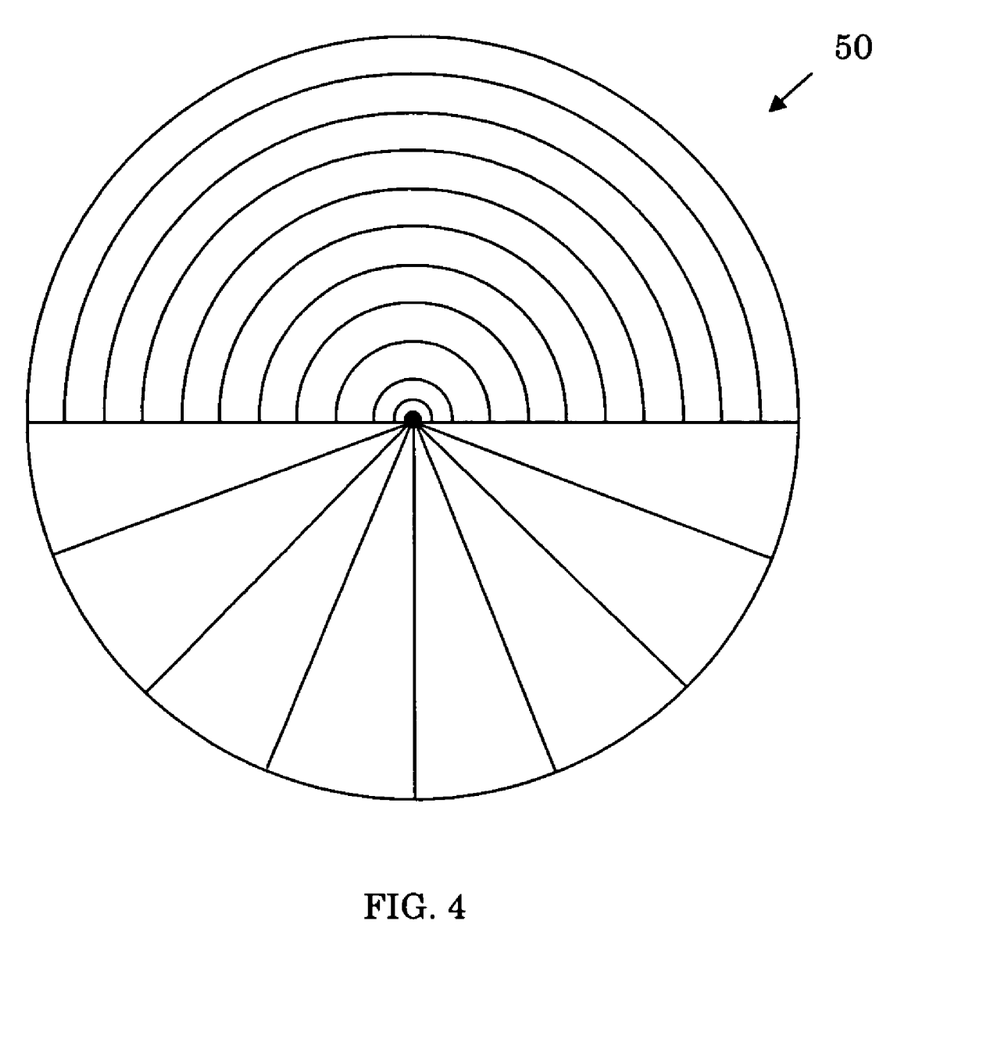
FIG. 4 is a top view showing one embodiment of the hybrid ring/wedge detector element image sensor mask used with the present invention.
Figure 5:
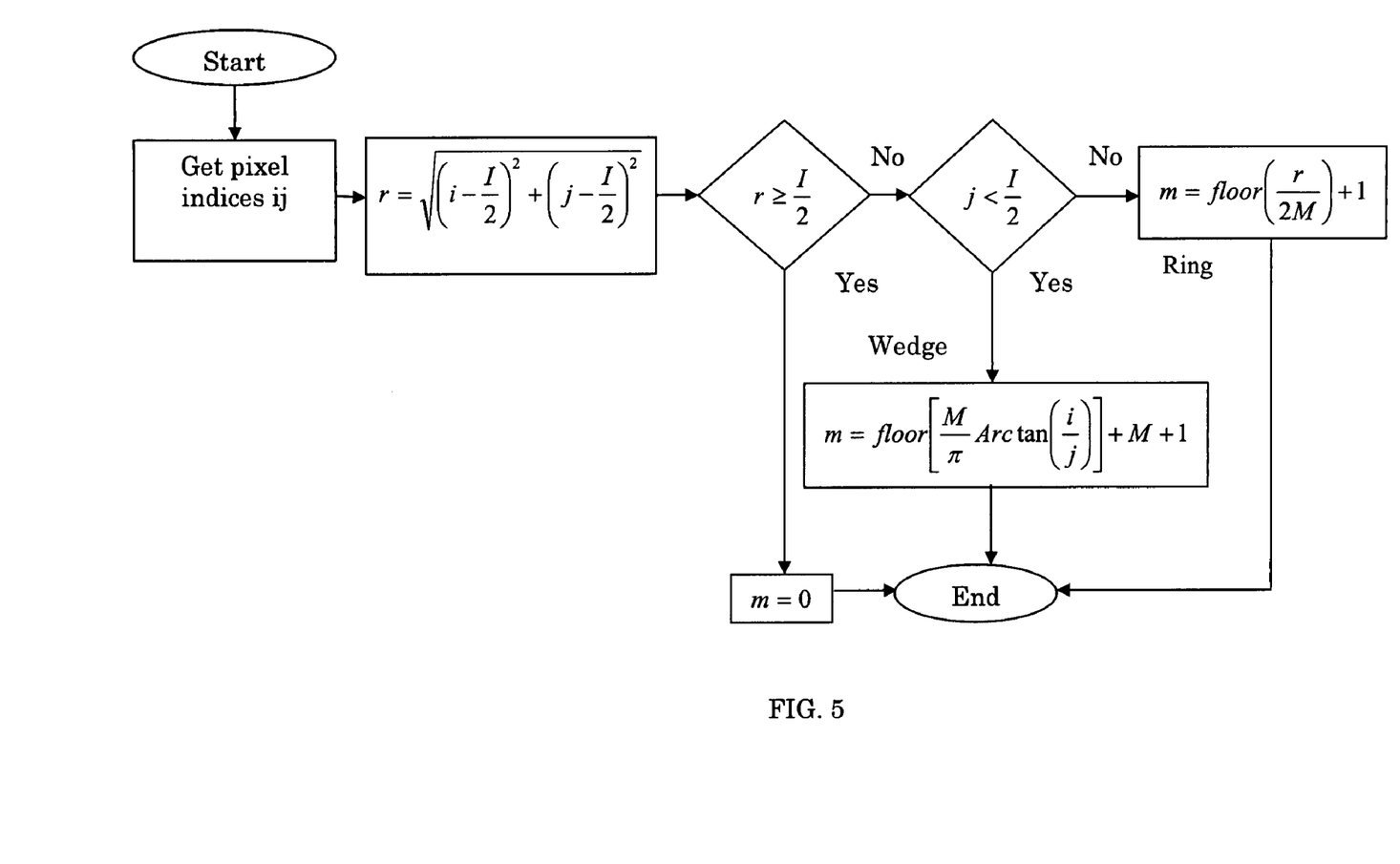
FIG. 5 is a flow diagram illustrating one of the mapping algorithms used with the present invention.

An example of this type of mapping algorithm for the hybrid ring/wedge detector element image sensor from FIG. 4 is shown in FIG. 5. Note that the terms "i" and "j" are pixel indices for the detector array rows and columns, "I" is the size of the detector array (assuming it is square), "I/2" defines the center of the detector array, which is the starting point for the rings and wedges, "M" is the number of virtual rings and the number of virtual wedges, and "m" is the index for the virtual rings and wedges. In an embodiment that includes 32 rings and 32 wedges, "M"=32, "m" ranges from 1–64, with "m"=1–32 referring to rings and "m"=33–64 referring to wedges. The "floor" term is a software function (in FIG. 5, the term is from LabView software, a software program known to those skilled in the relevant art) that causes the "r/2M" term to be rounded to the next lowest whole number. Thus, if this term equals 5.1, the output of this function is 5. In a similar manner, if this term equals 5.8, the output of this function is also 5. The "floor" term is also typically referred to as a "truncation" function. In alternative embodiments, the pixels may not be square and the equations shown in FIG. 5 would need to be modified accordingly. In addition, alternative embodiments may include different numbers of rings and wedges, e.g., 10 rings and 20 wedges, etc., and the virtual center may not be the exact center of the detector array.

The image processor retrieves pixel digital data and pixel location data from the pixel image sensor 30 by sending control signals to the pixel image sensor 30 that cause it to capture and send frames of information to the image processing board 20. Each frame includes pixel location data and pixel digital data for each pixel included in the pixel image sensor 30. The image processor uses this data to determine the pixel digital data associated with each pixel in the pixel image sensor 30.

The image processor retrieves image sensor masks by sending mask requests to a mask memory 46 located on the image processing board 20 that cause the mask memory 46 to send image sensor masks to the image processing board 20.

Using the pixel location data, the image sensor masks, and one of the mapping algorithms discussed previously, the image processor maps each pixel included in the digital pixel image sensor 30 to the image sensor masks and identifies pixels that can be combined together to create "virtual detector elements," or "super-pixels," having the same size, shape, and location as the detector elements included in the image sensor masks. The image processor then sums the digital pixel signal data for all of the pixels mapped to each "virtual detector element" to generate the detector digital data and outputs that data to the camera interface board 22.

In a preferred embodiment, the image processor maps the pixel digital data as it arrives at the image processor. In alternative embodiments, however, the image processor may collect all of the pixel digital data before it performs the mapping calculations.

In some cases, the pixel digital data for a given pixel must be split between one or more "super-pixels" because portions of the pixel fall within each of these "super-pixels." When this happens, the image processor uses a weighting factor to determine what portion of the digital pixel signal data should go to each "super-pixel."

The image processor allows a user to load different image sensor masks into the mask memory 46 using an external computer system or flash memory. This allows the camera to use common hardware to create a variety of different camera configurations and to be easily programmed to perform the functions normally associated with multiple different types of special purpose electronic cameras. This also allows the camera to be easily programmed to perform the functions associated with one type of special purpose electronic camera and then another. This further permits experimental and developmental users to change camera configurations without purchasing new special purpose electronic cameras.

The image processor allows a user to program the camera to use different types of mapping algorithms using an external computer system. This provides users with the ability to vary the processing time required to perform mapping as necessary from one application to another.

In one embodiment, the image processing circuit 48 includes a programmable logic device, such as a field programmable gate array (FPGA) circuit from the Virtex-II Pro family of FPGAs manufactured by Xilinx, Inc., part number XC2VP50, and the mask memory 46 includes a 16 Mbit Synchronous Random Access Memory (SRAM) chip manufactured by Cypress Semiconductor Corporation, part number CY7C1371.

In Detailed information regarding the Virtex FPGA is included in a document entitled "Virtex-II Pro Platform FPGAs: Introduction and Overview" published by Xilinx, Inc. This document is hereby incorporated by reference into the present application. Detailed information regarding the Cypress SRAM chip may be found in a document entitled "512K×36/1M×18 Flow-Thru SRAM with NoBL Architecture" published by Cypress. This document is also incorporated by reference into the present application.

Figure 6:
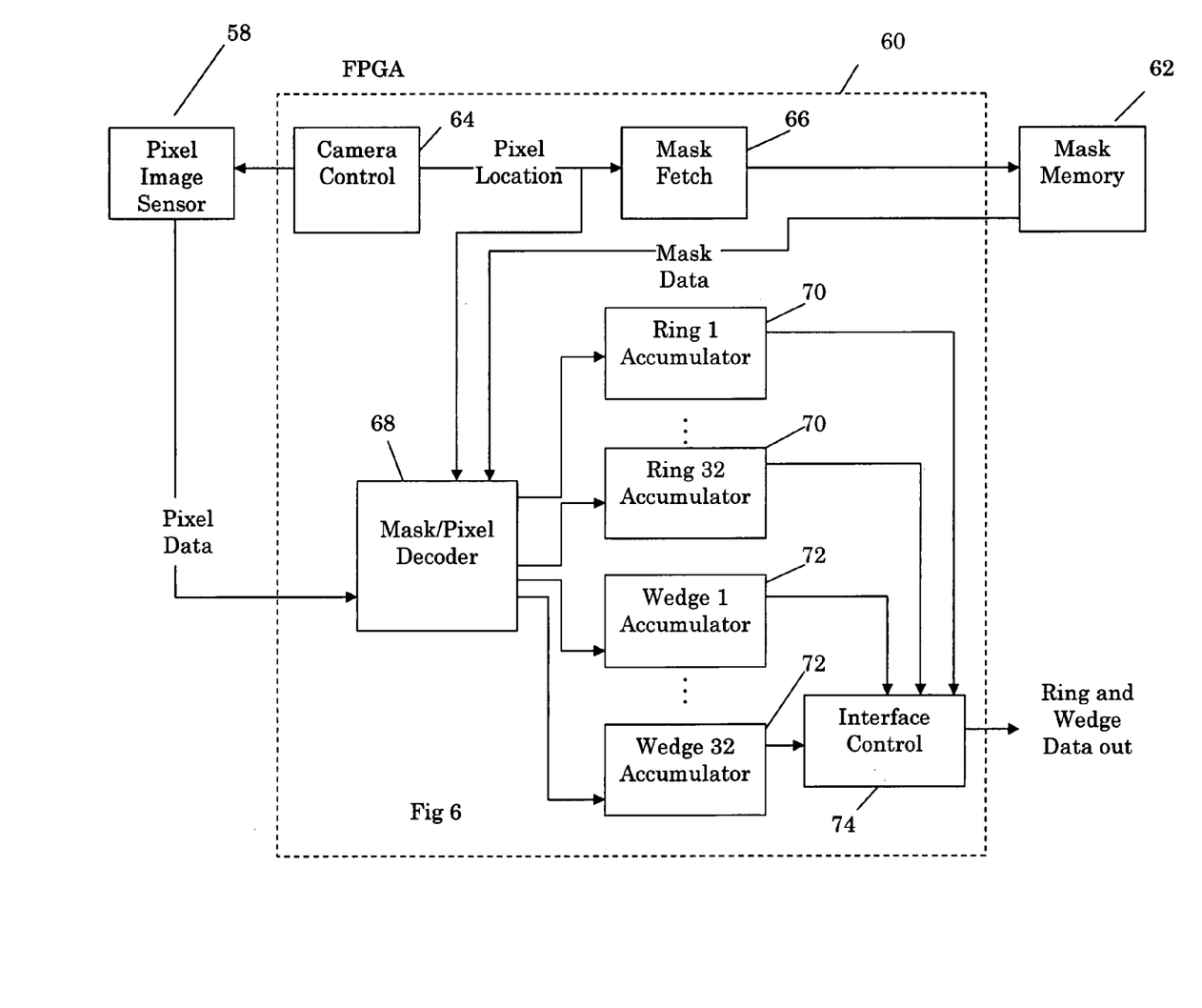
FIG. 6 is a block diagram showing an embodiment of the present invention that includes a field programmable gate array (FPGA) and illustrates the operation of the present invention when using the hybrid ring/wedge detector element image sensor mask shown in FIG. 4.

A simplified block diagram illustrating the use of an FPGA to implement the present invention and the processing of ring and wedge information for a hybrid ring/wedge detector element image sensor is shown in FIG. 6. As shown in that figure, this embodiment includes a pixel image sensor 58, an FPGA 60, and mask memory 62. The pixel image sensor 58 and mask memory 62 operate as indicated previously.

The figure includes a series of blocks representing various portions of the FPGA 60 that are responsible for the different functions performed by the FPGA 60. The camera control block 64 represents the portion of the FPGA 60 that is responsible for interfacing with the pixel image sensor 58 and starting frame captures. This portion is also responsible for tracking pixel location on each input frame and passing this information to the Mask Fetch block 66 and the Mask/Pixel Decoder block 68. The Mask Fetch block 66 represents the portion of the FPGA 60 that is responsible for retrieving image sensor mask information from the mask memory 62, which may be an external storage media such as static random access memory or SRAM.

The image sensor mask information, or Mask Data, is supplied to the Mask/Pixel Decoder block 68, which represents the portion of the FPGA 60 that is responsible for mapping each pixel into one of 11 Ring accumulators 70 or one of 8 Wedge accumulators 72, one accumulator for each of the ring and wedge shaped detector elements shown in FIG. 4. The Ring and Wedge accumulators 70 and 72, represent the portions of the FPGA 60 that are responsible for summing all of the pixel values, i.e., the pixel digital data discussed previously, mapped into each ring or wedge detector element for each frame of data.

At the end of each frame, the portion of the FPGA 60 represented by the Interface Control Block 74 reads all of the accumulators and formats a packet of data that can be sent out a serial port on the FPGA 60. As indicated above, the block diagram shown in FIG. 6 is tailored to the hybrid ring/wedge detector element image sensor shown in FIG. 4 but any remapping of the camera into different regions can be accommodated by altering the mask.

In alternative embodiments, the camera of the present invention may include a digital signal processing (DSP) board (not shown), including a DSP chip such as the TMS320VC33 DSP chip, manufactured by Texas Instruments Incorporated. This DSP is described in detail in a document entitled "TMS320VC33 Digital Signal Processor" published by Texas Instruments. That document is hereby incorporated by reference into the present application. In these embodiments, the DSP board is connected between the image processing board 20 and the camera interface board 22 and is used to process the detector digital data prior to outputting that data to the external computer system 28. The DSP in these embodiments may be used to perform some of the functions, such as the calculations associated with the algorithm shown in FIG. 5, that are performed by the FPGA in other embodiments.

Figure 7:
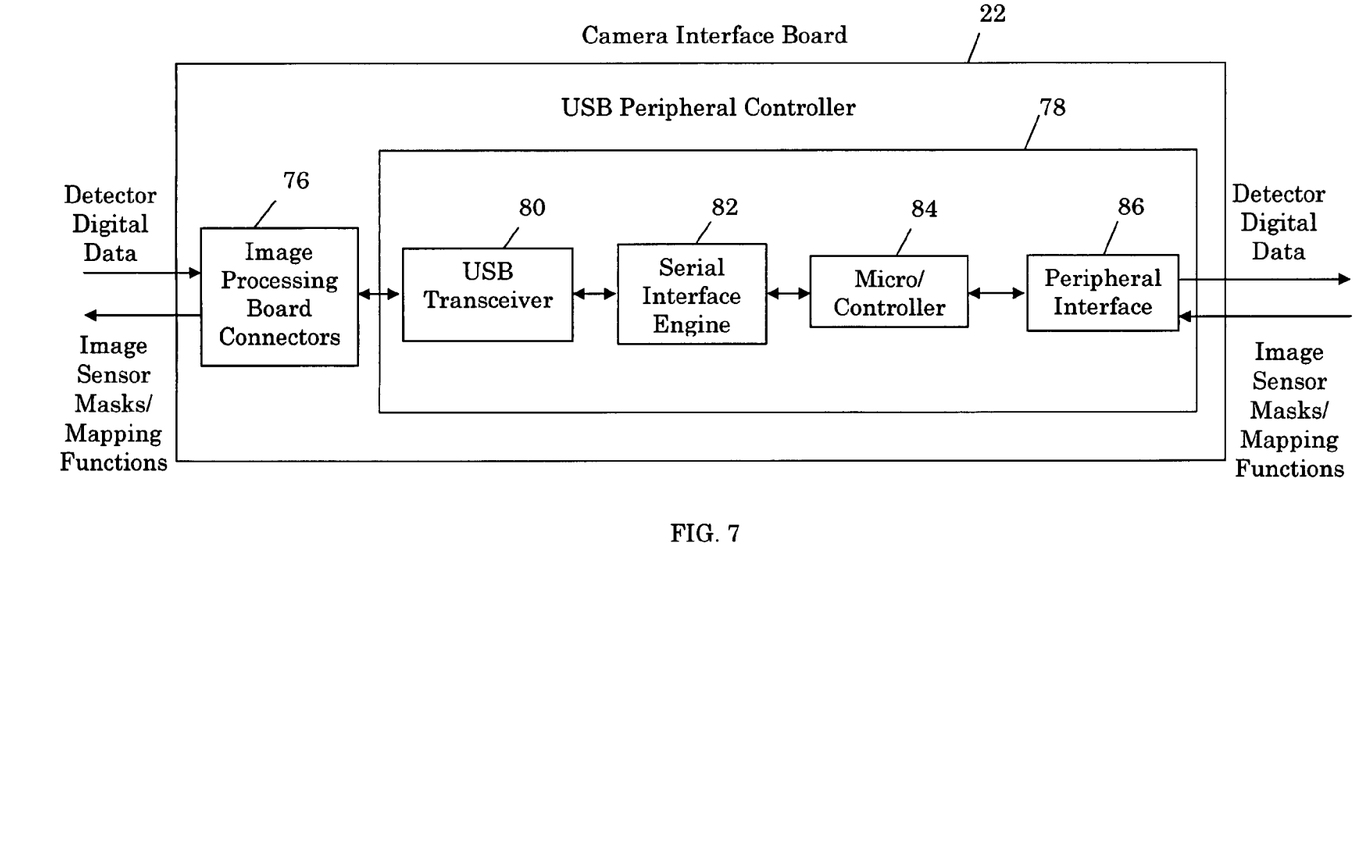
FIG. 7 is a block diagram showing one embodiment of the camera interface board of the present invention.

Referring to FIG. 7, the camera interface board 22 is designed to receive programming instructions, including mapping algorithms, and image sensor masks from an external computer system 28 (see FIG. 1) or flash memory, and to output the detector digital data generated by the camera to the computer system.

The camera interface board 22 includes image processing board connectors 76, which are used to connected the camera interface board 22 to the image processing board 20, and an integrated Universal Serial Bus (USB) peripheral controller 78, which is used to pass the detector digital data, image sensor masks, and mapping algorithms between the image processing board 20 and the external computer 28. The USB peripheral controller 78 includes a USB transceiver 80 for transmitting and receiving data from the image processing board 20, a serial interface engine 82 (SIE) for handling USB protocol issues, a microcontroller 84 for handling application specific functions, and a peripheral interface 86 for use in connecting the camera interface board 22 to the external computer system 28. The USB transceiver 80 is connected to the image processing board connectors 76 and the peripheral interface 86 is connected to the camera interface connectors 16 mounted on the camera enclosure 12 (see FIG. 1).

In one embodiment, the USB peripheral controller 78 includes a USB 2.0 integrated microcontroller chip manufactured by Cypress Semiconductor Corporation, part number CY7C68013. This chip is described in detail in a document entitled "CY7C68013 EZ-USB FX2 USB Microcontroller High-Speed USB Peripheral Controller" published by Cypress. That document is hereby incorporated by reference into the present application.

Thus, although there have been described particular embodiments of the present invention of a Programmable Multifunction Electronic Camera, it is not intended that such references be construed as limitations upon the scope of this invention except as set forth in the following claims.

The invention claimed is:

1. An electronic camera, comprising:
a pixel digital image sensor for receiving an image from a lens assembly and for generating pixel signal digital data representative of the received image;
an image processing circuit connected to the pixel digital image sensor for converting the pixel signal digital data into detector element signal digital data representative of analog detector element image sensor signals that would be generated by a detector element image sensor receiving the image received by the pixel digital image sensor, the image processing circuit operable to convert the pixel signal digital data into detector element signal digital data by retrieving the pixel signal digital data and pixel location data from the pixel digital image sensor, retrieving a detector element image sensor mask containing information representative of a detector element image sensor from a mask memory, mapping each pixel included in the pixel digital image sensor to one of the detector elements included in the detector element image sensor mask using a mapping algorithm, and combining the pixel digital data for all of the pixels mapped to each one of the detector elements to generate the detector element signal digital data.

2. The electronic camera of claim 1, wherein the detector element image sensor mask contains information regarding the size, shape, and location of the detector elements included in the detector element image sensor mask.

3. The electronic camera of claim 1, wherein the image processing circuit includes an image sensor input/output interface for receiving pixel signal digital data from the pixel digital image sensor and for sending image sensor control signals to the pixel digital image sensor.

4. The electronic camera of claim 3, wherein the image processing circuit includes a camera input/output interface for outputting the detector element signal digital data.

5. The electronic camera of claim 4, wherein the image processing circuit includes a mask memory interface for receiving the detector element image sensor from the mask memory.

6. The electronic camera of claim 1, wherein the image processing circuit includes an image processor for generating image sensor control signals that cause the pixel image sensor to send the pixel signal digital data and pixel location data to the image processing circuit, for generating mask request signals that cause the mask memory to send the detector element image sensor mask to the image processing circuit, for mapping the pixels in the pixel digital image sensor to the detector elements included in the detector element image sensor mask, for combining the pixel signal digital data for pixels mapped to each one of the detector elements, and for outputting the detector element signal digital data.

7. The electronic camera of claim 6, wherein the image processor is further operable to store the detector element image sensor map in the mask memory and to store the mapping algorithm in the image processor.

8. The electronic camera of claim 6, wherein the image processor is further operable to allow a user to load different detector element image sensor masks into the mask memory.

9. The electronic camera of claim 8, wherein the image processor is operable to allow a user to load different detector element image sensor masks into the mask memory using an external computer system or flash memory.

10. The electronic camera of claim 6, wherein the image processor is further operable to allow a user to program the camera to use different types of mapping algorithms.

11. The electronic camera of claim 10, wherein the image processor is operable to allow a user to program the camera to use different types of mapping algorithms using an external computer system.

12. The electronic camera of claim 6, wherein the image processor includes a programmable logic device.

13. The electronic camera of claim 12, wherein the programmable logic device is a field programmable gate array and the mask memory is synchronous random access memory.

14. An electronic camera, comprising:
an enclosure;
a lens assembly mounted to the enclosure, the lens assembly including a lens for generating images and a lens mounting assembly for mounting the lens on the enclosure;
camera interface connectors mounted to the enclosure for connecting the camera to an external computer system or flash memory, the camera interface connectors including one or more universal serial bus connectors;
an image sensor board mounted inside the enclosure for receiving images from the lens assembly and generating pixel signal digital data representative of the received images and pixel location data representative of a location for each pixel included in the image sensor board, the image sensor board including a pixel digital image sensor having a pixel array for generating analog pixel signals representative of the received images, analog to digital converters for converting the analog pixel signals into the pixel signal digital data, a sensor input/output interface for outputting the pixel signal digital data and the pixel location data, and for receiving image sensor control signals that cause the pixel digital image sensor to generate the pixel signal digital data and the pixel location data, and sensor controls for controlling the conversion of the analog pixel signals into the pixel signal digital data based on the image sensor control signals and the outputting of the pixel signal digital data and the pixel location data;
an image processing board connected to the image sensor board and mounted inside the enclosure for converting the pixel signal digital data into detector element signal digital data representative of analog detector element image sensor signals that would be generated by any one of a variety of different detector element image sensors receiving the images received by the image sensor board, the image processing board including an image processor circuit for converting the pixel signal digital data into the detector element signal digital data by retrieving the pixel signal digital data and pixel location data from the pixel image sensor, retrieving detector element image sensor masks containing information representative of detector element image sensors from a mask memory included on the image processing board, mapping each pixel in the pixel image sensor to one of the detector elements included in the image sensor masks using the pixel location data and a mapping algorithm, and combining the pixel signal digital data for all of the pixels mapped to each one of the detector elements to generate the detector element signal digital data; and
a camera interface board connected to the image processing board and the camera interface connectors, and mounted inside the enclosure, for outputting the detector element signal digital data to the external computer system and for receiving mapping algorithms and detector element image sensor masks from the external computer system, the camera interface board including an integrated universal serial bus peripheral controller for outputting and receiving the detector element signal digital data, the mapping algorithms, and the detector element image sensor masks.

15. The electronic camera of claim 14, wherein the image processor circuit is further operable to store the detector element image sensor map in the mask memory and to store the mapping algorithm in the image processor, to allow a user to load different detector element image sensor masks into the mask memory using an external computer system or flash memory, and to allow a user to program the camera to use different types of mapping algorithms using the external computer system.

* * * * *